US011663014B2

United States Patent
Abhishek Raja et al.

(10) Patent No.: US 11,663,014 B2
(45) Date of Patent: May 30, 2023

(54) SPECULATIVELY EXECUTING INSTRUCTIONS THAT FOLLOW A STATUS UPDATING INSTRUCTION

(71) Applicant: Arm Limited, Cambridge (GB)

(72) Inventors: Abhishek Raja, Austin, TX (US);
Rakesh Shaji Lal, Austin, TX (US);
Michael Filippo, Driftwood, TX (US);
Glen Andrew Harris, Austin, TX (US);
Vasu Kudaravalli, Austin, TX (US);
Huzefa Moiz Sanjeliwala, Austin, TX (US); Jason Setter, Austin, TX (US)

(73) Assignee: ARM LIMITED, Cambridge (GB)

( * ) Notice: Subject to any disclaimer, the term of this patent is extended or adjusted under 35 U.S.C. 154(b) by 225 days.

(21) Appl. No.: 16/550,612

(22) Filed: Aug. 26, 2019

(65) Prior Publication Data
US 2021/0064377 A1 Mar. 4, 2021

(51) Int. Cl.
*G06F 9/38* (2018.01)
*G06F 9/312* (2018.01)
*G06F 9/30* (2018.01)

(52) U.S. Cl.
CPC ........ *G06F 9/3842* (2013.01); *G06F 9/30043* (2013.01); *G06F 9/30094* (2013.01); *G06F 9/30101* (2013.01); *G06F 9/3857* (2013.01); *G06F 9/3861* (2013.01)

(58) Field of Classification Search
CPC ............ G06F 9/30043; G06F 9/30101; G06F 9/3842; G06F 9/3861; G06F 9/30094; G06F 9/3857
See application file for complete search history.

(56) References Cited

U.S. PATENT DOCUMENTS

| 2003/0126414 A1* | 7/2003 | Grochowski | G06F 9/3844 712/225 |
| 2010/0325483 A1* | 12/2010 | Gonion | G06F 8/4441 714/10 |
| 2012/0265966 A1* | 10/2012 | Estlick | G06F 9/3855 712/208 |
| 2012/0290820 A1* | 11/2012 | Olson | G06F 9/3851 712/233 |

(Continued)

OTHER PUBLICATIONS

Reinman et al., "Predictive Techniques for Aggressive Load Speculation", Dec. 1998, pp. 1-11.*

(Continued)

*Primary Examiner* — David J. Huisman
(74) *Attorney, Agent, or Firm* — Nixon & Vanderhye, P.C.

(57) ABSTRACT

A data processing apparatus is provided that comprises fetch circuitry to fetch an instruction stream comprising a plurality of instructions, including a status updating instruction, from storage circuitry. Status storage circuitry stores a status value. Execution circuitry executes the instructions, wherein at least some of the instructions are executed in an order other than in the instruction stream. For the status updating instruction, the execution circuitry is adapted to update the status value based on execution of the status updating instruction. Flush circuitry flushes, when the status storage circuitry is updated, following instructions that appear after the status updating instruction in the instruction stream.

14 Claims, 7 Drawing Sheets

(56) References Cited

U.S. PATENT DOCUMENTS

2018/0203756 A1* 7/2018 Stephens ............ G06F 11/0721

OTHER PUBLICATIONS

Stephens et al., "The ARM Scalable Vector Extension", Mar./Apr. 2017, pp. 26-39.*
Sheikh et al., "Load Value Prediction via Path-based Address Prediction: Avoiding Mispredictions due to Conflicting Stores", Oct. 2017, pp. 423-435.*

* cited by examiner

```
for (i=0; i<5; i++)
    SETFFR
    LDFF [X_i]
    RDFFR
    .
    .
    .
    .
    .
    .
    .
end for
```

FIG. 4

SPECULATIVELY EXECUTING INSTRUCTIONS THAT FOLLOW A STATUS UPDATING INSTRUCTION

TECHNICAL FIELD

The present disclosure relates to data processing. More particularly, it relates to execution order of instructions in data processing apparatuses.

DESCRIPTION

In a data processing apparatus, certain instructions may produce particular side effects during their execution. Such side effects could, for example, be represented as a status value in a status register. For instance, a fault or error could arise for all or part of the instruction, which might be indicated by an update to the status value. Waiting to determine whether particular side effects have occurred can be time consuming and can lead to a stall in processing time until it is discovered whether or to what extent such side effects occurred.

SUMMARY

Viewed from a first example configuration, there is provided a data processing apparatus comprising: fetch circuitry to fetch an instruction stream comprising a plurality of instructions, including a status updating instruction, from storage circuitry; status storage circuitry to store a status value; execution circuitry to execute the instructions, wherein at least some of the instructions are executed in an order other than in the instruction stream, and wherein, for the status updating instruction, the execution circuitry is adapted to update the status value based on execution of the status updating instruction; and flush circuitry to flush, when the status storage circuitry is updated, following instructions that appear after the status updating instruction in the instruction stream.

Viewed from a second example configuration, there is provided a data processing method comprising: fetching an instruction stream comprising a plurality of instructions, including a status updating instruction, from storage circuitry; storing a status value in status storage circuitry; executing the instructions, wherein at least some of the instructions are executed in an order other than in the instruction stream, and wherein, for the status updating instruction, the step of executing the instructions updates the status value based on execution of the status updating instruction; and flushing, when the status storage circuitry is updated, following instructions that appear after the status updating instruction in the instruction stream.

Viewed from a third example configuration, there is provided a data processing apparatus comprising: means for fetching an instruction stream comprising a plurality of instructions, including a status updating instruction, from storage circuitry;
means for storing a status value; means for executing the instructions, wherein at least some of the instructions are executed in an order other than in the instruction stream, and wherein, for the status updating instruction, the means for executing the instructions updates the status value based on execution of the status updating instruction; and means for flushing, when means for storing a status value is updated, following instructions that appear after the status updating instruction in the instruction stream.

BRIEF DESCRIPTION OF THE DRAWINGS

The present invention will be described further, by way of example only, with reference to embodiments thereof as illustrated in the accompanying drawings, in which:

FIG. 4 shows an example in which a loop comprises a status updating instruction in accordance with some embodiments;

DESCRIPTION OF EXAMPLE EMBODIMENTS

Figure 1:
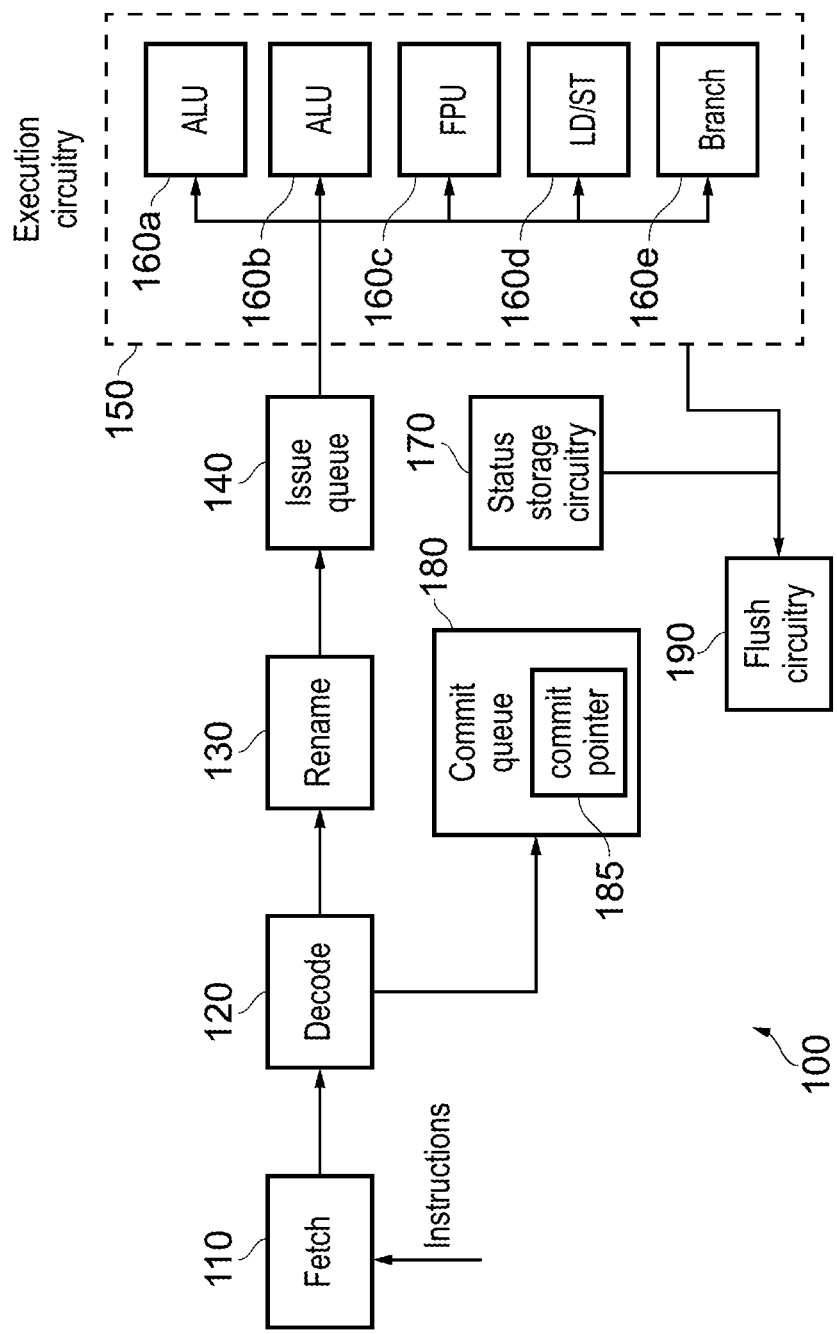
FIG. 1 schematically illustrates a data processing apparatus in accordance with some embodiments.

Before discussing the embodiments with reference to the accompanying figures, the following description of embodiments is provided.

In accordance with one aspect there is provided fetch circuitry to fetch an instruction stream comprising a plurality of instructions, including a status updating instruction, from storage circuitry; status storage circuitry to store a status value; execution circuitry to execute the instructions, wherein at least some of the instructions are executed in an order other than in the instruction stream, and wherein, for the status updating instruction, the execution circuitry is adapted to update the status value based on execution of the status updating instruction; and flush circuitry to flush, when the status storage circuitry is updated, following instructions that appear after the status updating instruction in the instruction stream.

The fetch circuitry fetches a stream of instructions from a storage circuitry which could be, for instance a main memory or could be an instruction cache. Within the stream is a status updating instruction, which has the potential to update the value in the status storage circuitry. The stream of instructions is sent for execution to execution circuitry. Some of the instructions that are executed are executed in an order other than the order in which those instructions appear in the instruction stream. In other words, some of the instructions are executed out-of-order. For the status updating instruction, the execution circuitry is adapted to update a status value, which is stored in status storage circuitry. The update is based on execution of the status updating instruction itself. That is to say that the status value in the status storage circuitry may or may not be updated depending on the execution of the status updating instruction and furthermore that a value of the status value, when the status value is changed, may be dependent on execution of the instruction. The apparatus also includes flush circuitry which flushes the system when the status storage circuitry is updated. In particular, instructions that appear after the status updating instruction in the stream are flushed—this can effectively achieve a "rewind" of the system. Note that there is no obligation for the status value and the status storage circuitry to be monitored for changes in order to cause the flush circuitry to perform the flush and in some embodiments, the status value is updated at a same time as a flush (e.g. when a flush request is sent to the commit queue). The execution circuitry that updates the status value may therefore also be configured to cause the flush to occur at the same time. The data processing apparatus is therefore able to continue to execute instructions that occur after the status updating instruction by executing those instructions out-of-order. For instance, such instructions may be executed speculatively. Such speculation assumes that the status value in the status storage circuitry is not going to change. In cases where this is true, no further action needs be taken and the efficiency of the system is maintained by continuing to execute instructions while the status updating instruction is resolved. In a case where the status updating instruction causes the status value to be updated, flush circuitry is provided in order to undo uncommitted instructions that executed out-of-order. In this way, efficiency of the system is preserved, while data integrity is also preserved by providing a rewind mechanism.

In some embodiments, the status updating instruction is a memory access instruction referencing a memory address; and the execution circuitry comprises memory access circuitry to perform, in response to the memory access instruction, an access of the memory address. A memory access instruction can be considered to be an instruction that in certain circumstances accesses memory. In particular, one or more memory addresses may be provided and in those circumstances, the memory at those memory addresses can be accessed. In other embodiments, the status updating instruction could be another long latency instruction (e.g. a multi-cycle executing instruction) such as a divide instruction. In any event, the status updating instruction performs its function and causes the status value in the status storage circuitry to be updated based on that execution.

In some embodiments, the memory access instruction conditionally performs the access of the memory address. Consequently, the memory address instruction need not always actually access memory. In particular, the memory access instruction could be an instruction for which the accessed memory is conditional or only takes place under certain circumstances. In some instances, the memory access instruction could contain a reference to a flag that indicates whether the instruction is to take place or could contain another configuration value that indicates the circumstances in which an actual memory access should take place.

In some embodiments, the memory access instruction is a load instruction; and the access is a load. A load instruction may (conditionally) access a location in memory and retrieve the data stored at that particular location. The retrieved data could then, for instance, be stored in a register.

In some embodiments, the memory access instruction is a vector load instruction. A vector load instruction can be considered to be an instruction that causes a number of contiguous or non-contiguous locations in memory to be accessed and for data in those locations to be loaded into a vector register. Such instructions are typically considered to be distinct from a scalar load instruction.

In some embodiments, the vector load instruction performs a contiguous load of data. A contiguous load of data can be used in order to load a number of data values from sequential addresses in memory into a vector register.

In some embodiments, the memory access instruction is adapted to cause the memory access circuitry to gather data from a plurality of non-contiguous addresses into a register. In such an example, the addresses of the value that are loaded into the vector register can be from a number of distinct addresses that are not adjacent to one and other. Such an operation is often referred to as a 'gather' operation.

In some embodiments, the execution circuitry is adapted to update the status value in response to a fault condition during the execution of the status updating instruction. The status value in the status storage circuitry may therefore be updated in response to a fault condition that occurs during execution of the status update instruction (e.g. during a memory access that occurs as part of the status update instruction). Note that there is not necessarily any obligation for the fault to actually be raised, but rather it is sufficient that the conditions present to normally cause a fault to occur. For example, in some embodiments, the status value may be updated in response to the detection of a situation in which a fault would occur. The updating of the status register could take the place of the fault actually being raised.

In some embodiments, the execution circuitry is adapted to update the status value in response to a fault condition during the execution of the status updating instruction; and in response to the fault condition being in respect of one of the plurality of addresses other than a first of the plurality of addresses, the status value is updated to correspond with the one of the plurality of addresses. As above, the fault condition does not necessitate a fault actually being raised, but rather it refers to the presence of circumstances that might cause a fault to occur. In such embodiments, the fault condition may relate to one of the addresses other than a first of the addresses in the plurality of addresses that are accessed in the memory. When this occurs, the status value is updated to correspond with the one of the plurality of addresses to which the fault relates. In this way, even if a fault is not actually generated, the status value can be updated to represent or indicate which of the addresses would have caused a fault to occur. If there is a fault condition and an exception isn't taken, the status value is updated to indicate which of the addresses caused that fault. Such a technique is particularly useful for vector load instructions or instructions where a number of different memory locations are accessed in one instruction, since this makes it possible to accurately respond to a fault condition, thereby providing knowledge of precisely which memory access caused the issue to arise. It will be appreciated that in other embodiments, the status value is always updated to correspond with an address that would have caused a fault. In some embodiments, an actual fault may be raised when the fault condition relates to the first of the plurality of addresses. The "first" address may be limited to those addresses that are considered to be active. A non-active address may be provided to the instruction together with an indication that the address is not be accessed.

In some embodiments, the execution circuitry is adapted to update the status value in response to an access to a device memory. Device memory accesses may not behave in exactly the same way as non-device memory accesses. For example, a read to a location in device memory could cause a side-effect, e.g. a value could be popped from a buffer such that it cannot be accessed again. The status value can therefore be updated to indicate the extent to which such instructions succeeded or failed to access memory, since simply executing device-memory accessing instructions again may not be desirable or even possible.

In some embodiments, the at least some of the instructions that are executed in an order other than in the instruction stream are dependent on the status value. The status value therefore indicates, in these embodiments, how the instructions are to be executed.

In some embodiments, at least some of the instructions are executed prior to the status updating instruction being completed. Accordingly, even though particular instructions (those that are executed in an order other than in the instruction stream) may be dependent on the status value, e.g. make use of the status value, those instructions may be permitted to execute before the status updating instruction has completed. This way, efficiency of the system is preserved with a consequence of not having to wait for the status updating instruction to complete execution before execution of instructions can continue.

In some embodiments, the plurality of instructions includes a further status updating instruction; and in response to the status updating instruction and the further status updating instruction both seeking to update the status value, the status updating instruction and the further status updating instruction update the status storage circuitry in an order in which they appear in the instruction stream. In general, status updating instructions can be issued freely and can complete freely. However, when a status updating instruction seeks to update the status value, it cannot do so speculatively and so by extension, two status updating instructions that seek to update the status value do so in the order in which they appear in the instruction stream. In practice, since it is dynamically determined whether a status updating instruction will update a status value, a status updating instruction can be issued any time and then can complete if either (a) the instruction does not seek to update the status value; or (b) the instruction does seek to update the status value and is the oldest uncommitted instruction (the commit pointer is pointing to the current instruction).

Particular embodiments will now be described with reference to the figures.

FIG. 1 schematically illustrates a data processing apparatus 100 in accordance with some embodiments. The data processing apparatus 100 includes fetch circuitry 110, which is responsible for fetching instructions from memory (either from a main memory or from a memory via a cache). The retrieved instructions are passed to decode circuitry 120 that generates one or more operations in response to instructions. From here, the operations are passed to a commit queue 180. The commit queue keeps track of the order in which the instructions are received so that if they are executed in a different order, they are committed (e.g. the execution is completed) in the same order that the instructions are received in, thereby providing data integrity. At the same time, the operations corresponding to the instructions are passed to rename circuitry 130 where false dependencies can be removed. From here, issue circuitry 140 is provided to issue the operations to execution circuitry 150. Such issuing may cause the instructions to be provided to the execution circuitry out of order. The execution circuitry may be made up of a number of execution units such as an arithmetic logic unit (ALU) 160a, a second ALU 160b, which is provided to enable multiple arithmetic operations to take place simultaneously, a floating point unit (FPU) 160c, a load/store unit 160d, and a branch unit 160e. Other examples of execution units will be known to the skilled person. These execution units receive the operations and perform one or more functions based on those operations. When the operations are completed, they are committed with reference to the commit queue so that even if the instructions are executed out-of-order, they are committed in the order in which they appear from the decode circuitry. A commit pointer 185 is provided in the commit queue 180 to track the next instruction that is to be committed. This pointer is incremented each time an instruction in the commit queue is committed.

Within the stream of instructions obtained by the fetch circuitry 110 may be a status updating instruction. This instruction is such that, when executed by one of the execution units 150, in dependence on a particular condition, the execution unit simultaneously updates a value stored in status storage circuitry 170 and also causes a flush to occur via flush circuitry 190. In these embodiments, the flush circuitry 190 is made to flush instructions that appeared in the stream of instructions after the status updating instruction. Note that although the flush circuitry 190 is shown as a separate component here, it may also form part of the commit queue 180.

In these embodiments, instructions occurring after the status updating instruction can continue to be executed out-of-order. This may include instructions that rely on the status value in the status storage circuitry 170. This is achieved by assuming that the status value in the status storage circuitry 170 will not be changed. Consequently, other instructions (even those instructions that are dependent on a value of the status value in the status storage circuitry 170) can be executed even before the status updating instruction has completed.

In some instances, the prediction that no change will be made to the status storage circuitry 170 will be incorrect. In these situations, the status storage circuitry 170 is updated and, at the same time, the flush circuitry 190 is made to flush those instructions that appeared after the instruction that had updated the status storage circuitry. Phrased differently, the data processing apparatus 100 makes it possible to speculatively execute instructions after the status updating instruction on the assumption that the status storage circuitry 170 will not be updated. If this turns out to be incorrect, then a rewind occurs flushing those instructions that executed based on incorrect information.

The process of enabling instructions to be executed out-of-order can be achieved at the rename circuitry 130. Here, the rename circuitry can disregard any apparent data dependency between the status updating instruction and any other instruction that follows it. The consequence of this is that the instructions will execute as if the status updating instruction made no change to the status storage circuitry 170.

Figure 2:
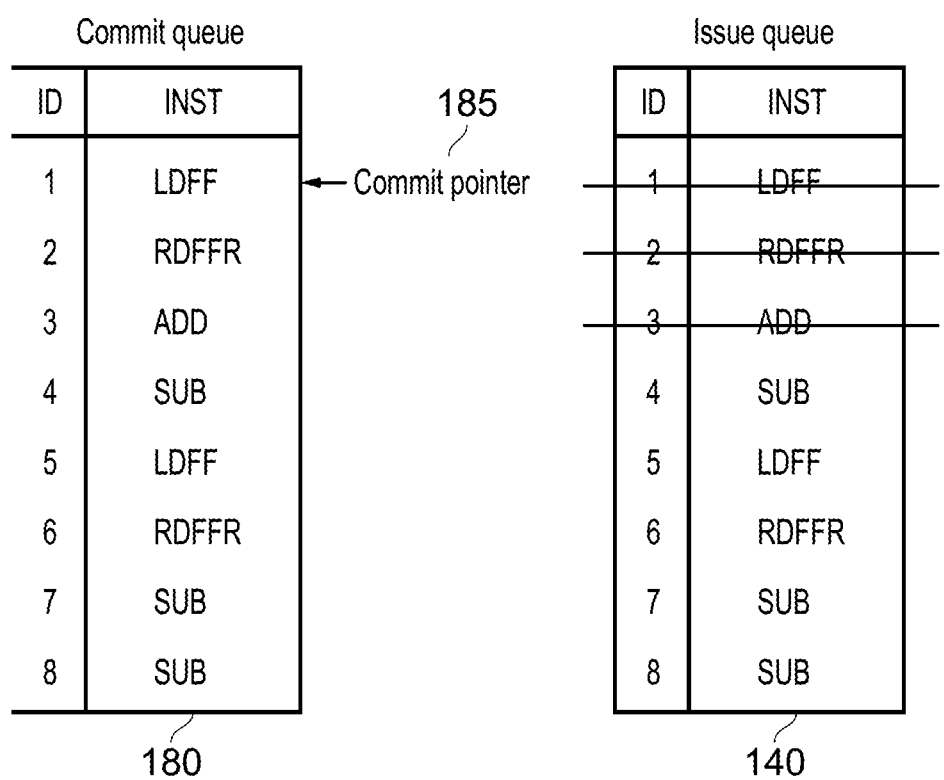
FIG. 2 shows an example of the commit queue and the issue queue in more detail in accordance with some embodiments.

FIG. 2 illustrates an example of the commit queue 180 and the issue queue 140 in more detail in accordance with some embodiments.

In these examples, an LDFF (id 1) instruction is presented. This is an example of a status updating instruction—specifically a type of vector load instruction that loads a number of data values (potentially from non-contiguous areas of memory) into a vector register. One particular feature of this instruction is that a special FF (first fault) register is provided, which is an example of the status storage circuitry 170. If a fault condition is met in respect of one of the memory locations referenced by the LDFF instruction then action is taken depending on whether the referenced memory location is the first location referenced by the instruction or not. If the location is a first location then a fault is raised. If not, then the FF register 170 is updated to correspond with the address for which the fault condition was met. It is then possible for software to react to this information. Typically, this occurs by running the instruction again with the problematic location as the first referenced location. This time, if a fault condition is met, then a fault is raised.

This example also makes use of an RDFFR instruction (id 2), which reads the FF register 170. The RDFFR instruction can therefore be used to determine whether a potential fault has arisen or not and the software can be made to react accordingly.

The commit queue 180 in FIG. 2 shows the LDFF instruction followed by the RDFFR instruction, followed by an ADD instruction (id 3) followed by a SUB instruction (id 4) followed by a second LDFF instruction (id 5), followed by a second RDFFR instruction (id 6), followed by two SUB instructions (ids 7 and 8). Ordinarily, each of the RDFFR instructions would be dependent on its corresponding LDFF instruction. That is to say that the RDFFR instructions would not be permitted to execute until such time as the LDFF instructions have completed, since they may alter the contents of the status register. In the present embodiments, however, such a dependency is disregarded and execution of the instructions is permitted to continue under the assumption that the FF register will not be updated. Accordingly, it can be seen in the issue queue 140, which illustrates the instructions that have been sent for execution, that the RDFFR instruction (id 2) and even the ADD instruction (id 3) have both already been issued (sent for execution) even before the LDFF instruction (id 1) has finished execution.

In general, it is possible for any of the instructions to be issued out-of-order in this way. A special situation arises in which two status updating instructions (e.g. two LDFF instructions) both wish to update the FF register 170. In this case, each of the status updating instructions can be issued out of order with respect to other instructions, but the status updating instructions are executed non-speculatively (since they seek to update the status register). That is to say that each of the LDFF instructions are completed in the order in which they exist in the commit queue. In practice, this can be achieved by means of the commit pointer 185. In particular, the status updating instructions can be issued, but in order to complete, each of those instructions either (a) do not seek to update the FF register 170 or (b) do seek to update the FF register 170 and their execution is delayed until the commit pointer points to that instruction. In this way, two status updating instructions that both seek to update the FF register 170 do so in order, while status updating instructions that do not seek to update the FF register are less constrained.

Figure 3:
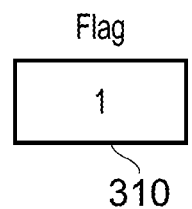
FIG. 3 shows an example of storage circuitry that may be used in accordance with some embodiments.

FIG. 3 shows an example of a storage circuit that may be used to assist in the removal of dependencies between the instructions in accordance with some embodiments. In particular, a flag register 310 is provided. The flag register is set (e.g. set to '1') in response to a SETFFR instruction, which sets a value of the status storage circuitry (e.g. to a default value). When the flag register 310 is set, a subsequent RDFFR instruction can assume that the status storage circuitry is set to the default value without actually reading the status storage circuitry. As a consequence of this, even if the LDFF instruction has not yet managed to set the value of the status storage circuitry (which may not be possible until such time as the LDFF instruction is the oldest uncommitted instruction), the RDFFR instruction can still proceed. If an LDFF instruction causes the status storage circuitry to be updated, then the flag register 310 is cleared (and instructions that rely on the status storage circuitry being the default value are flushed). Subsequent instructions then read the storage circuitry rather than assuming it is set to a particular value.

As a consequence of this, it is possible for (e.g. rename circuitry) to remove dependencies between RDFFR instructions and LDFF instructions. The RDFFR instructions can thereby execute speculatively without having to wait on previous instructions.

Figure 4:
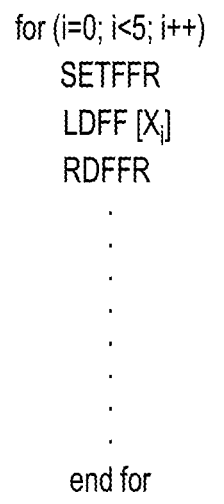

FIG. 4 illustrates an example of a loop comprising a status updating instruction (LDFF) in accordance with some embodiments. In this example, the loop includes a SETFFR instruction, which causes a value of the FF register to be reset (i.e. to indicate that no faults have occurred in respect of any memory addresses). This is followed by an LDFF instruction, which causes a load to occur on a group of memory addresses as defined in a vector register 'Xi'. This is then followed by an RDFFR instruction, which causes the FF register to be read in order to determine whether a fault occurred or not. If the FF register indicates that a fault occurred, a special subroutine (not shown) is executed. The loop is repeated five times for five different register values. Accordingly, a number of memory locations are sequentially read into registers using the LDFF instruction.

In this example, the SETFFR instruction (which in this example is one example of a status updating instruction) causes the flag register 310 to be set. Consequently, rather than waiting for the LDFF instruction to complete (which in this example is a second example of a status updating instruction), the RDFFR instruction assumes that the value of the FF register will remain unchanged. Further instructions may then be permitted to execute. In particular these further instructions could be further instructions within the iteration of the loop, or could be instructions at a subsequent iteration of the loop such as a second execution of the LDFF instruction or the RDFFR instruction. RDFFR instructions assume that no change is made to the FF register. As previously explained, if an LDFF instruction does cause an update to the FF register then a flush will occur on the subsequent instructions (since they will have used an incorrect value of the FF register) and the flag register 310 is cleared. Subsequent instructions will then read the FF register until such time as a SETFFR instruction is executed. Where multiple instructions are outstanding and multiple LDFF instructions seek to update the FF register, these are completed in the order in which they occur in the instruction stream as fetched by the fetch circuitry. Similarly, LDFF instructions that seek to update the FF register and SETFFR instructions are executed in order with respect to each other, since both instructions seek to change the FF register.

The above technique makes it possible to not only remove dependencies between iterations, but also breaks dependencies within a single iteration as well (e.g. between the LDFF instruction and the RDFFR instruction). Furthermore, this can be done with a small amount of circuitry, such as the flag register 310.

Figure 5:
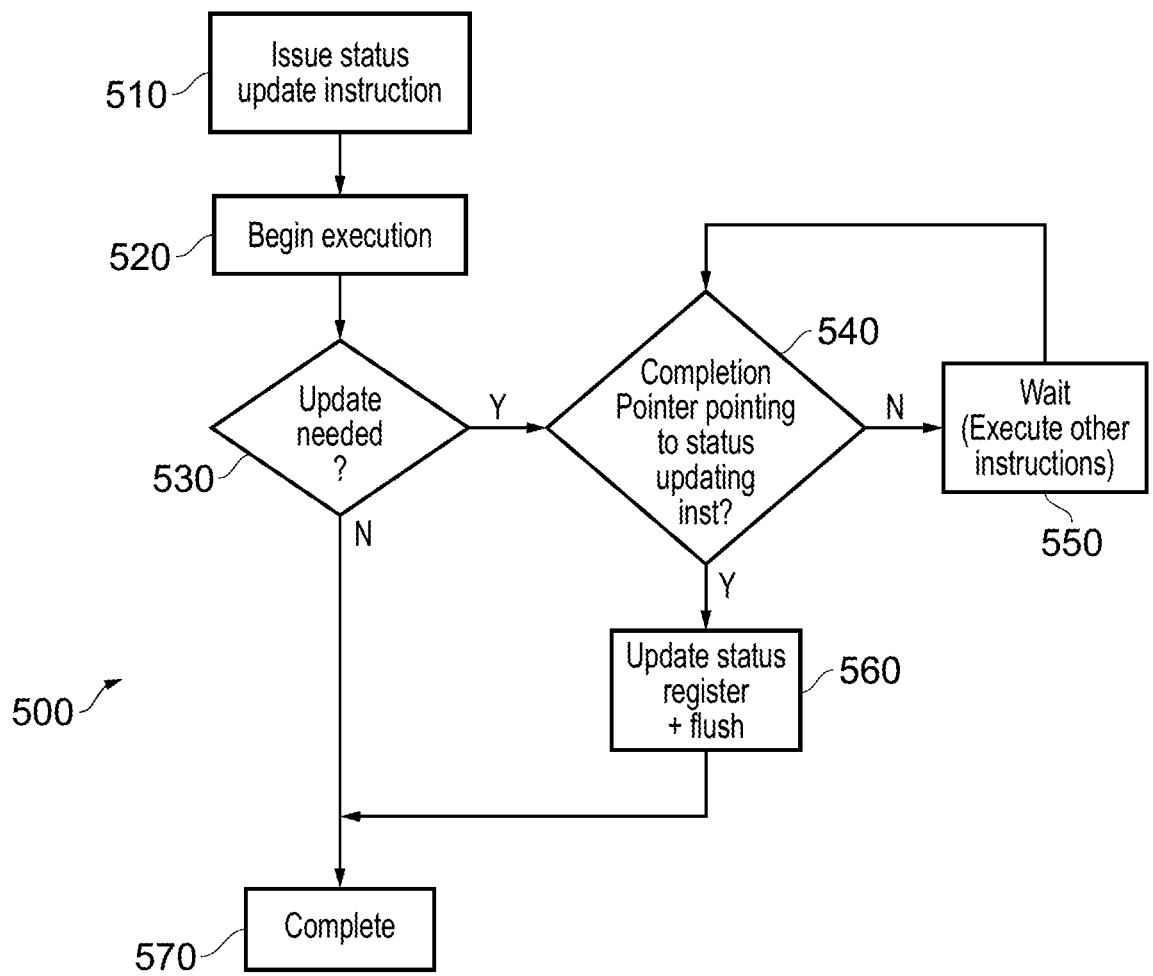
FIG. 5 shows a flowchart that illustrates a method of data processing in accordance with some embodiments.

FIG. 5 shows a flowchart 500 that illustrates a method of data processing in accordance with some embodiments. In particular, FIG. 5 illustrates the process of issuing and completing status update instructions. At a step 510, the status update instruction is issued. This may occur out-of-order as compared to the order in which the instruction appeared relative to other instructions in the instruction stream. At a step 520, execution of the status update instruction begins. At a step 530, it is determined whether or not the status update instruction will update the status register. If not, then the instruction completes at a step 570. Otherwise, at a step 540, it is determined whether the commit pointer currently points to the current instruction (indicating that this is the oldest uncommitted instruction). If not, then it is made to wait while other instructions continue to execute at step 550. The process then returns to step 540 again. Eventually, due to the completion of other instructions, the status update instruction will be the oldest outstanding instruction (e.g. the commit pointer will point to the current status updating instruction). At that point, at step 560, the status register is updated and a flush is ordered, which will flush all younger instructions since they may have used a stale value in status storage circuitry. The instruction then completes at step 570.

In this way, status update instructions can execute in order or out of order depending on whether they seek to update the status register. If they seek to update the status register then the instructions cannot be executed speculatively and, as a consequence, multiple status update instructions that seek to update the status register are executed in order relative to one another.

Figure 6:
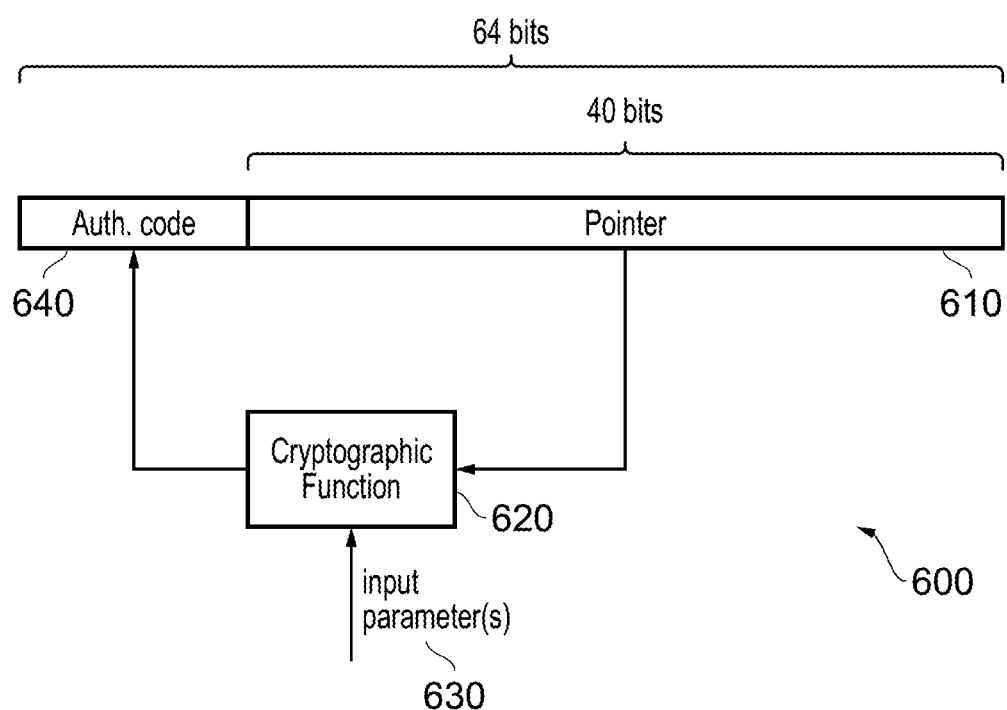
FIG. 6 illustrates further examples in accordance with some embodiments.

FIG. 6 illustrates related examples involving authenticated pointers. An authenticated or signed pointer 600 is used to avoid subversion of pointers as an attack vector in a data processing apparatus. Although an architecture may provide up to 64-bits in a register that holds a virtual address, only some of those bits (e.g. 40 bits) may actually be used to represent a virtual address. The remaining (e.g. 24 bits) may simply be copies of the most significant bit of the virtual address. This particular formatting of pointers is known as "canonical form". It will therefore be appreciated that the upper bits of a pointer in a register are effectively unused. To this end, some or all of the upper bits can be used to store an authentication code or checksum. This is achieved by taking the relevant 40 bits of the pointer value 610 that actually refers to an address in the virtual address space, and applying this value to a cryptographic function 620 using one or more further input parameters 630, to produce an authentication code 640 which is inserted into the upper unused bits of the pointer in a register.

When the pointer is to be accessed, the lower 40 bits of the pointer 610 are again applied to the cryptographic function 620 using the input parameter(s) 630 to produce a further copy of the authentication code which is compared to the authentication code 640 in the register. If the two authentication codes match then the pointer 610 has not been changed since the authentication code 640 was generated. The canonical form can then be restored by copying the most significant bits of the pointer 610 to overwrite the authentication code. If the authentication fails, then bits of the authentication code 640 can be corrupted and attempted use of the pointer will result in a fault.

Typically, the cryptographic function 620 is complicated and can take multiple processor cycles to perform. As a consequence of this, latency can occur when the pointer is used, for instance, as a result of a branch instruction. Such latency occurs since the cryptographic function 620 must be performed before the branch occurs.

In the present embodiment, a combined load/branch instruction is provided in which the canonical value of the pointer is generated and a branch to that location occurs speculatively while the cryptographic function 620 is performed. As a consequence, instructions are executed without having to wait on a result of the authentication. This can be performed at the decode circuitry, which may initially decode a BRAA instruction (branch to register, with pointer authentication) as the sequence of operations:

AUTIA Xn, Xm
STRIP tmp0, Xn
BR tmp0

The AUTIA operation causes an authentication of the pointer stored in register Xn using Xm as a 'key' for the authentication. The authentication operation causes the pointer in Xn to be modified to either a pointer in canonical form (i.e. with the authentication code removed) if the authentication is correct or to a corrupted pointer if the authentication is invalid. The STRIP operation simply removes the authentication code from the pointer in Xn and stores the result in tmp0 (i.e. it produces the canonical form of the pointer). The final BR operation performs a branch to the address in tmp0. The STRIP operation can be made to execute before the AUTIA operation has completed (i.e. using the old version of the pointer prior to authentication modifications being performed). As a consequence, the BR operation will be performed on the pointer before it is known whether the authentication succeeded or not. In practice, the BR instruction is made dependent on the STRIP operation rather than a result of the AUTIA operation. STRIP is not dependent on AUTIA because AUTIA does not, ostensibly, provide output to Xn. AUTIA merely modifies Xn based on the result of the authentication and hence if STRIP is issued before AUTIA is completed, STRIP simply uses the old (pre AUTIA) version of Xn.

In any event, if it is then discovered that the authentication failed, this series of operations (and any following operations) are flushed (e.g. by flush circuitry 190). The second time around, the BRAA instruction is executed non-speculatively and is decoded to the following series of operations:

AUTIA Xn, Xm
BR Xn

Here, since there is no STRIP operation, the branch can only occur once the authentication code has been removed by AUTIA. Hence, the BR operation is dependent on the outcome of the AUTIA operation. Consequently, the BR operation cannot execute until the AUTIA operation is complete. This causes a delay, particularly if the AUTIA operation takes several cycles to complete.

Another way in which this can be implemented is by decoding to the following series of operations:

AUTIA tmp0, Xn, Xm
BR Xn

In this example, rather than using Xn as a source and updating Xn with the result, the result of the AUTIA operation is directed to a temporary register tmp0. As a consequence, the BR operation does not need to wait on the Xn register, thereby breaking the dependency between the instructions. The BR operation will therefore use the old version of the Xn. Note, however, that since Xn will have the authentication code within the top bits (no STRIP operation has been performed), control bits are set so that a canonical check is not performed as part of the BR operation. This therefore differs from the non-speculative execution illustrated above, which occurs when authentication fails, in which control bits are set to cause the BR operation to perform the canonical check.

Figure 7:
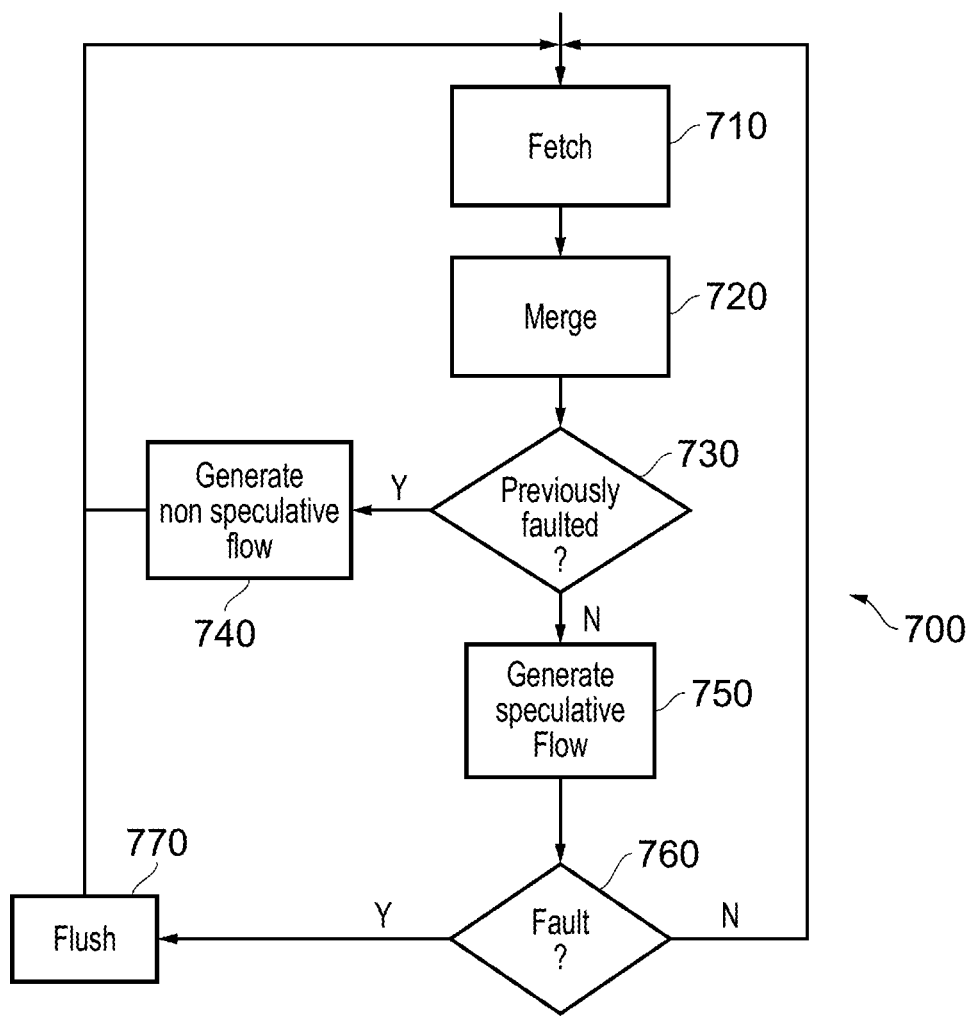
FIG. 7 shows a flowchart that illustrates a method of data processing in accordance with some embodiments.

FIG. 7 illustrates a flow chart 700 that shows a method of data processing in accordance with some embodiments. At a step 710, instructions are fetched, at a step 720 instructions are merged.

Merging could take place in a case where there is a first instruction that performs pointer authentication followed by a branch instruction that performs a branch based on a result of the pointer authentication. This might occur where there are no single combined "authenticate and branch/load" instructions that support the specific type of branch/load that is sought. Such merging therefore looks for instances of an authentication instruction followed by a branch/load instruction and produces a series of operations as illustrated above. The instructions are thereby effectively fused together to remove the data dependency between the authentication and the proceeding branch (or load). This is performed while instructions are decoded (or while decoded instructions are stored in the cache). The fusing of the instructions causes the operations to assume that the authentication succeeds and causes the authentication operation to cause a flush if it fails.

Returning to the flowchart, at a step 730, it is determined whether the authentication instruction has previously faulted. If so, then at step 740, the decoding process generates a non-speculative series of micro-operations, and the process returns to step 710. If not, then at step 750, a speculative series of micro-operations are generated that cause the following instructions to be executed, assuming that the authentication will succeed. Thereafter, if a fault occurs at step 760, then the micro-operations corresponding to the speculative flow and those micro-operations corresponding with any later instructions, are flushed at step 770 where the process returns to step 710. If no fault occurs, then the process simply returns to step 710.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
    fetch circuitry to fetch an instruction stream comprising a plurality of instructions, including a plurality of status updating instructions, from storage circuitry;
    status storage circuitry to store a status value;
    execution circuitry to execute the plurality of instructions in the instruction stream, wherein at least some of the plurality of instructions are executed in an order other than in the instruction stream, and wherein, for the plurality of status updating instructions, the execution circuitry is adapted to update the status value based on a result of executing the plurality of status updating instructions; and
    flush circuitry to flush, when the status storage circuitry is updated, following instructions that appear after one of the plurality of status updating instructions in the instruction stream that updated the status storage circuitry, wherein
    for a given one of the plurality of status updating instructions, if the given one of the plurality of status updating instructions seeks to update the status value, completion of execution of the given one of the plurality of status updating instructions is deferred until the given one of the plurality of status updating instructions is an oldest uncommitted instruction, and otherwise execution of the given one of the plurality of status updating instructions is completed out of order relative to at least one other of the plurality of status updating instructions.

2. The data processing apparatus according to claim 1, wherein
    each of the plurality of status updating instructions is a memory access instruction referencing a memory address; and
    the execution circuitry comprises memory access circuitry to perform, in response to the memory access instruction, an access of the memory address.

3. The data processing apparatus according to claim 2, wherein
    the memory access instruction conditionally performs the access of the memory address.

4. The data processing apparatus according to claim 2, wherein
    the memory access instruction is a load instruction; and
    the access is a load.

5. The data processing apparatus according to claim 2, wherein
    the memory access instruction is a vector load instruction.

6. The data processing apparatus according to claim 5, wherein
    the vector load instruction performs a contiguous load of data.

7. The data processing apparatus according to claim 5, wherein
    the memory access instruction is adapted to cause the memory access circuitry to gather data from a plurality of non-contiguous addresses into a register.

8. The data processing apparatus according to claim 1, wherein
    the execution circuitry is adapted to update the status value in response to a fault condition during the execution of the plurality of status updating instructions.

9. The data processing apparatus according to claim 7, wherein
    the execution circuitry is adapted to update the status value in response to a fault condition during the execution of the plurality of status updating instructions; and
    in response to the fault condition being in respect of one of the plurality of addresses other than a first of the plurality of addresses, the status value is updated to correspond with the one of the plurality of addresses.

10. The data processing apparatus according to claim 1, wherein
    the execution circuitry is adapted to update the status value in response to an access to a device memory.

11. The data processing apparatus according to claim 1, wherein
    the at least some of the plurality of instructions in the instruction stream that are executed in an order other than in the instruction stream are dependent on the status value.

12. The data processing apparatus according to claim 11, wherein
    the at least some of the plurality of instructions in the instruction stream are executed prior to the given one of the plurality of status updating instructions being completed.

13. The data processing apparatus according to claim 1, wherein
    in response to a first status updating instruction and a second status updating instruction, of the plurality of status updating instructions, both seeking to update the status value, the first status updating instruction and the second status updating instruction update the status storage circuitry in an order in which they appear in the instruction stream.

14. A data processing method comprising:
    fetching an instruction stream comprising a plurality of instructions, including a plurality of status updating instructions, from storage circuitry;
    storing a status value in status storage circuitry;

executing the plurality of instructions stream, wherein at least some of the plurality of instructions are executed in an order other than in the instruction stream, and wherein, for the plurality of status updating instructions, the step of executing the plurality of instructions updates the status value based on a result of executing the plurality of status updating instructions; and flushing, when the status storage circuitry is updated, following instructions that appear after one of the plurality of status updating instructions in the instruction stream that updated the status storage circuitry, wherein for a given one of the plurality of status updating instructions, if the given one of the plurality of status updating instructions seeks to update the status value, completion of execution of the given one of the plurality of status updating instructions is deferred until the given one of the plurality of status updating instructions is an oldest uncommitted instruction, and otherwise execution of the given one of the plurality of status updating instructions is completed out of order relative to at least one other of the plurality of status updating instructions.

* * * * *